United States Patent
Yin (10) Patent No.: US 10,133,408 B2
(45) Date of Patent: Nov. 20, 2018

(54) METHOD, SYSTEM AND COMPUTER PROGRAM PRODUCT

(71) Applicant: Lenovo (Beijing) Limited, Beijing (CN)

(72) Inventor: Zhengjun Yin, Beijing (CN)

(73) Assignee: LENOVO (BEIJING) LIMITED, Beijing (CN)

(*) Notice: Subject to any disclaimer, the term of this patent is extended or adjusted under 35 U.S.C. 154(b) by 0 days.

(21) Appl. No.: 15/458,746

(22) Filed: Mar. 14, 2017

(65) Prior Publication Data
US 2017/0264962 A1   Sep. 14, 2017

(30) Foreign Application Priority Data
Mar. 14, 2016  (CN) .......................... 2016 1 0144202

(51) Int. Cl.
*H04N 21/4402*  (2011.01)
*G06F 3/041*  (2006.01)
*H04N 21/472*  (2011.01)
*H04N 21/4728*  (2011.01)
*G11B 27/034*  (2006.01)
*G06F 3/044*  (2006.01)
*G06F 3/046*  (2006.01)

(52) U.S. Cl.
CPC ............ *G06F 3/0416* (2013.01); *G06F 3/044* (2013.01); *G06F 3/046* (2013.01); *G11B 27/034* (2013.01); *H04N 21/440245* (2013.01); *H04N 21/4728* (2013.01); *H04N 21/47205* (2013.01); *H04N 21/47217* (2013.01); *G06F 2203/04101* (2013.01)

(58) Field of Classification Search
None
See application file for complete search history.

(56) References Cited

U.S. PATENT DOCUMENTS

| | | | |
|---|---|---|---|
| 7,587,738 B2* | 9/2009 | Nakamura | H04N 7/18 348/14.01 |
| 2013/0246510 A1* | 9/2013 | Shimamoto | H04L 65/602 709/203 |
| 2014/0191986 A1* | 7/2014 | Kim | G06F 3/0488 345/173 |
| 2015/0248167 A1* | 9/2015 | Turbell | G06F 3/017 715/754 |
| 2016/0364110 A1* | 12/2016 | Matsuda | G06F 3/0484 |

* cited by examiner

*Primary Examiner* — Pankaj Kumar
*Assistant Examiner* — Charles N Hicks
(74) *Attorney, Agent, or Firm* — Kunzler, PC (57) ABSTRACT

A method, electronic device and computer program product are disclosed. The method includes detecting an operation made on a device, determining a frame of video, and sends the frame of video to a second device. The device includes a processor, a display, a playing unit, and a signal transmitting unit. The processor detects an operation made on the device while the playing unit is playing a video, determines a frame of video, and controls the signal transmitting unit to send the frame of video to a second device. The computer program product includes executable code to perform: detecting an operation made on a device, determining a frame of video and sending the frame of video to a second device.

16 Claims, 5 Drawing Sheets

METHOD, SYSTEM AND COMPUTER PROGRAM PRODUCT

FIELD

The present disclosure relates to the field of electronic technologies, and in particular, relates to an information processing method and an electronic device.

BACKGROUND

With the development of technology, electronic devices with a video player function, such as mobile phones and computers, become more and more popular in people's life. In addition to playing video files for entertainment, such electronic devices are capable of sharing a currently playing video file with another electronic device. However, this sharing is mainly achieved by recording the desired segment of the video with a local screen recording tool, which is an inefficient solution.

SUMMARY

Embodiments of a method, electronic device, and computer program product are disclosed.

The method comprises: detecting a predetermined operation performed on a first electronic device that is playing a video file; determining at least one frame of the video file corresponding to the predetermined operation; and sending the at least one frame of the video file as determined to a second electronic device.

The electronic device comprises: a processor, a display operatively coupled to the processor, a playing unit operatively coupled to the processor and the display, and a signal transmitting unit operatively coupled to the processor; wherein the processor: detects a predetermined operation while the playing unit is playing a video file, determines at least one frame of the video file corresponding to the predetermined operation, and controls the signal transmitting unit to send the at least one frame of the video file as determined to a second electronic device.

The computer program product comprises a computer readable storage medium that stores code executable by a processor, the executable code comprising code to perform: detecting a predetermined operation performed on a first electronic device that is playing a video file; determining at least one frame of the video file corresponding to the predetermined operation; and sending the at least one frame of the video file as determined to a second electronic device.

BRIEF DESCRIPTION OF THE DRAWINGS

The foregoing and other objects, features and advantages of the present disclosure will become more apparent from the detailed descriptions of the embodiments of the present disclosure in conjunction with the drawings. The drawings are used to provide a further understanding of the embodiments of the present disclosure and constitute a part of the Description, which, together with the embodiments of the present disclosure, serve to explain the present disclosure and are not construed as a limitation to the present disclosure. Unless explicitly indicated, the drawings should not be understood as being drawn to scale. In the drawings, the same reference numerals generally represent the same components or steps. In the drawings.

DETAILED DESCRIPTION

An information processing method and an electronic device are provided in exemplary embodiments of the present disclosure to solve the present technical problem of excessive time required to share video files. In order to solve this problem, the general idea of the technical solution is presented through exemplary embodiments as follows.

An information processing method applied to a first electronic device is provided, which includes: detecting and obtaining a predetermined operation while playing a video file; acquiring information of at least one frame of image in the video file in response to the predetermined operation; obtaining image data by adding a file name of the video file to the information of at least one frame of image; and sending the image data to a second electronic device.

In other words, when a specific segment needs to be shared while playing a video file, one or more image frames of the specific segment are captured and sent to a sharing target terminal along with a name of the video file. In this manner, a long processing time traditionally needed for recording the specific segment to be shared in the video file with a local screen recording tool can be avoided. Therefore, the technical problem in the prior art can be effectively solved, so as to increase efficiency of sharing a video file by the electronic device.

In order to make the objective, technical solution and advantages of the embodiments in the present disclosure clearer, the technical solutions in the embodiments are described as follows with reference to the accompanying drawings of the embodiments. It is apparent that the embodiments described are not all, but rather only some of the embodiments. Based on the embodiments in the present disclosure, all other embodiments derived by a person skilled in the art without any creative work shall fall within the protection scope of the technical solution in the present disclosure.

Figure 1:
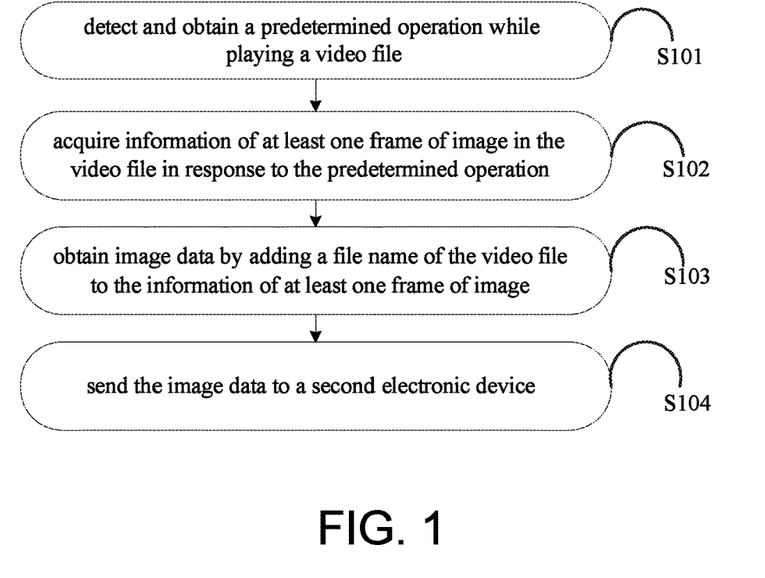
FIG. 1 is a flow diagram of one embodiment an information processing method.

In FIG. 1, one embodiment of an information processing method applied to a first electronic device is provided, which includes steps S101, S102, S103 and S104.

In step S101, a predetermined operation is detected and obtained while playing a video file. In step S102, information of at least one frame in the video file is acquired in response to the predetermined operation. In step S103, image data is obtained by adding a file name of the video file to the information of at least one frame of image. In step S104, the image data is sent to a second electronic device.

In practice, the first electronic device to which the information processing method is applied may be any electronic device having a video player function, such as a smart phone, a desktop computer, a laptop computer, a tablet computer or other electronic device; therefore, they are not all listed herein. In the description, the implementation of the method is described in detail with an example of a mobile phone.

In Step S101, a predetermined operation is detected and obtained while playing a video file. The above example of a mobile phone will be used in describing one specific implementation. In practice, the mobile phone has a video player to play various video files. While playing a first video file, the mobile phone is capable of detecting and obtaining an operation performed on the screen (or on specific positions of the screen) of the mobile phone. The mobile phone determines whether the detected operation is the predetermined operation for indicating an intent to share the first video file that is being played. The predetermined operation may be a slide operation, a click operation or other operation. For example, if the predetermined operation is a click operation, the mobile phone can detect and obtain the click operation performed on the screen of the mobile phone.

After the step S101 is performed, the step S102 is performed, in which information of at least one frame of image in the video file is acquired in response to the predetermined operation.

The example of a mobile phone will continue to be relied upon. After the click operation (or other predetermined operation) is detected and obtained by the mobile phone, the mobile phone acquires, in response to the click operation, information about the images to be shared from the first video file that is being played. The information of images to be shared may be information of one, two, or any number of frames. It can be understood that the number of acquired frames of image can be determined by those skilled in the art as situations require, and therefore it is not limited herein.

In practice, step S102 may be implemented in any one of the following manners.

Figure 2:
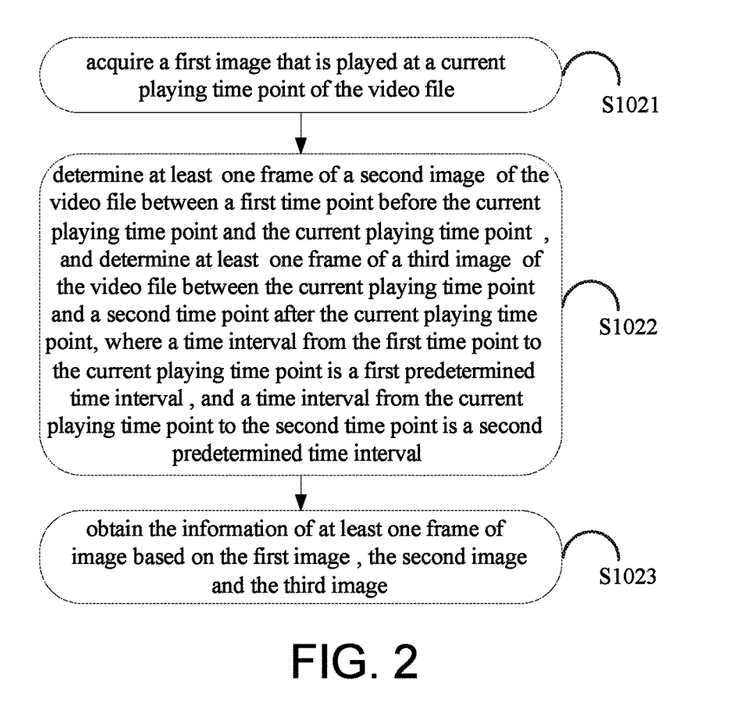
FIG. 2 is a flow diagram of one embodiment of a first implementation of step S102.

FIG. 2 shows one embodiment of step S102, which includes step S1021 to step S1023.

In step S1021, a first image of the video file that is played at a current playing time point is acquired.

In step S1022, at least one frame of a second image of the video file between a first time point located before the current playing time point and the current playing time point is determined, and at least one frame of a third image of the video file between the current playing time point and a second time point located after the current playing time point is determined. A time interval from the first time point to the current playing time point is designated as a first predetermined time interval, and a time interval from the current playing time point to the second time point is designated as a second predetermined time interval.

In step S1023, the information of at least one frame of image is obtained based on the first image, the second image and the third image.

The above example of a mobile phone and a click operation is continued here. In response to the click operation performed on the screen of the mobile phone, the mobile phone acquires an image of the video file that is played at the current playing time point. For convenience, the image of the video file that is played at the current playing time point is referred to as a first image. Supposing that the current playing time point is the $8^{th}$ second of the first video file, the first image is the frame of image corresponding to the $8^{th}$ second of the first video file. After that, the mobile phone acquires at least one frame of image of the video file in the time interval between a time point located before the current playing time point and the current playing time point, and at least one frame of image of the video file in the time interval between the current playing time point and a time point located after the current playing time point.

For purposes of this example, it is assumed that the time point before the current playing time point is the $4^{th}$ second of the first video file, which means that there is a time interval of four seconds between the $4^{th}$ second and the $8^{th}$ second of the first video file. Again, for purposes of this example, it is also assumed that the time point after the current playing time point is the $13^{th}$ second, which means that there is a time interval of five seconds between the $8^{th}$ second and the $13^{th}$ second of the first video file. In this case, the mobile phone may acquire one or more frames of image between the $4^{th}$ second and the $8^{th}$ second of the first video file. For example, the mobile phone may acquire the frame of image corresponding to the $4^{th}$ second of the first video file, or the frame of image corresponding to the $4.5^{th}$ second of the first video file, or the frame of image corresponding to the $6^{th}$ second of the first video file, or may even acquire all of the frames of image corresponding to the $4^{th}$ second, the $4.5^{th}$ second and the $6^{th}$ second of the first video file. The possible frames of image are not limited to those specifically mentioned herein.

The mobile phone may also acquire one or more frames of image between the $8^{th}$ second and the $13^{th}$ second of the first video file. For example, the mobile phone may acquire the frame of image corresponding to the $8.1^{th}$ second of the first video file, the frame of image corresponding to the $9^{th}$ second of the first video file, the frame of image corresponding to the $13^{th}$ second of the first video file, or may acquire all of the frames of image corresponding to the $8.1^{th}$ second, the $9^{th}$ second and the $13^{th}$ second of the first video file. The following description employs an example wherein the mobile phone acquires the frame of image corresponding to the $4.5^{th}$ second between the $4^{th}$ second and the $8^{th}$ second of the first video file, which is referred to as a second image for a convenient description, and acquires the frame of image corresponding to the $13^{th}$ second between the $8^{th}$ second and the $13^{th}$ second of the first video file, which is referred to as a third image. After acquiring the first image, the second image and the third image, the mobile phone may obtain information of three frames of image of the to-be-shared video segment based on the three images.

Figure 3:
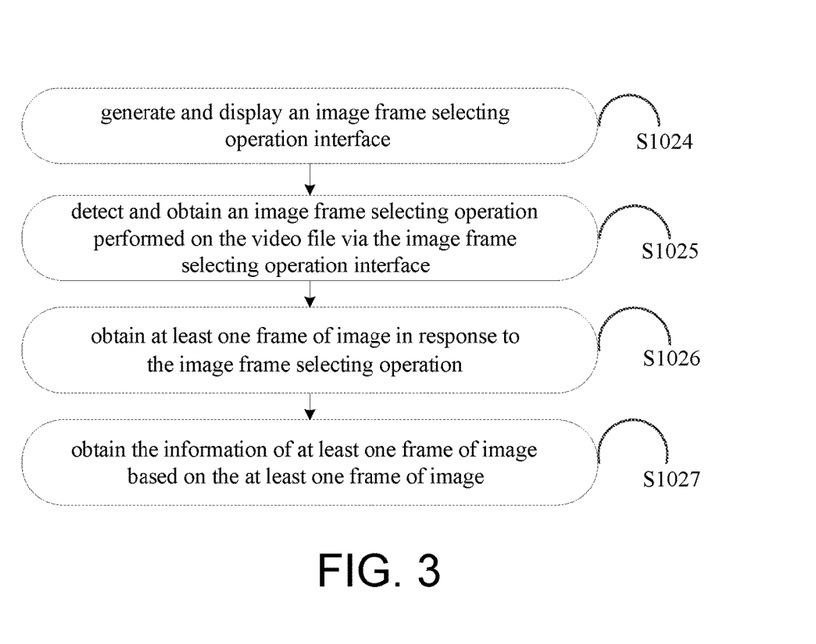
FIG. 3 is a flow diagram of one embodiment of a second implementation of step S102.

FIG. 3 shows a second implementation of step S102, which includes steps S1024 to S1027. In step S1024, an image frame selecting operation interface is generated and displayed. In step S1025, an image frame selecting operation performed on the video file via the image frame selecting operation interface is detected and obtained. In step S1026, at least one frame of image is obtained in response to the image frame selecting operation. In step S1027, the information of at least one frame of image is obtained based on the at least one frame of image.

The above example of a mobile phone and a click operation will be used here as well. In response to the click operation performed on the screen of the mobile phone, the mobile phone generates the image frame selecting operation interface, with which the mobile phone may obtain an image frame selected by a user from the first video file to be shared. The generated image frame selecting operation interface may be displayed at any position in the window in which the video file is being played. Alternatively, the mobile phone may also reduce the size of the window in which the video file is being played, so as to have a space on the screen to display the generated image frame selecting operation interface. The following description gives an example wherein the image frame selecting operation interface is displayed in the middle of the window in which the video file is being played. However, the embodiments are not limited to this specific example.

In this example, the mobile phone may detect and obtain, via the image frame selecting operation interface displayed in the middle of the window in which the video file is being played, an image frame selecting operation performed by a user for a video segment of the first video file to be shared. Along with the image frame selecting operation, additional images may be selected. In response to the selecting operation, the mobile phone may obtain a corresponding number of images. For example, if the user only selects one frame of image corresponding to the first second of the first video file, the mobile phone obtains the frame of image corresponding to the first second of the first video file.

If only frames of image corresponding to the $5^{th}$ second and the $8^{th}$ second of the first video file are selected, the mobile phone obtains the frames of image corresponding to the $5^{th}$ second and the $8^{th}$ second of the first video file. In one example, the image frame selecting operation only selects one frame of image corresponding to the first second of the first video file and the mobile phone obtains the frame of image corresponding to the first second of the first video file. In this example, the mobile phone creates the information of one frame of image of the to-be-shared video segment based on the obtained frame of image corresponding to the first second of the first video file.

After step S102 is performed, step S103 is performed, in which image data is obtained by adding a file name of the video file to the information of at least one frame of image.

The above example of a mobile phone is continued here. In some embodiments, after obtaining the information of three frames of image of the to-be-shared video segment based on the first image, the second image and the third image with one implementation of step S102, the mobile phone adds the file name of the first video file to the information of the three frames of image, to form image data of the to-be-shared video segment in the first video file.

Alternatively, in some embodiments, after obtaining the information of one frame of image of the to-be-shared video segment based on the frame of image corresponding to the first second of the first video file with the second implementation of step S102, the mobile phone adds the file name of the first video file to the information of the one frame of image, to form image data of the to-be-shared video segment in the first video file.

Figure 4:
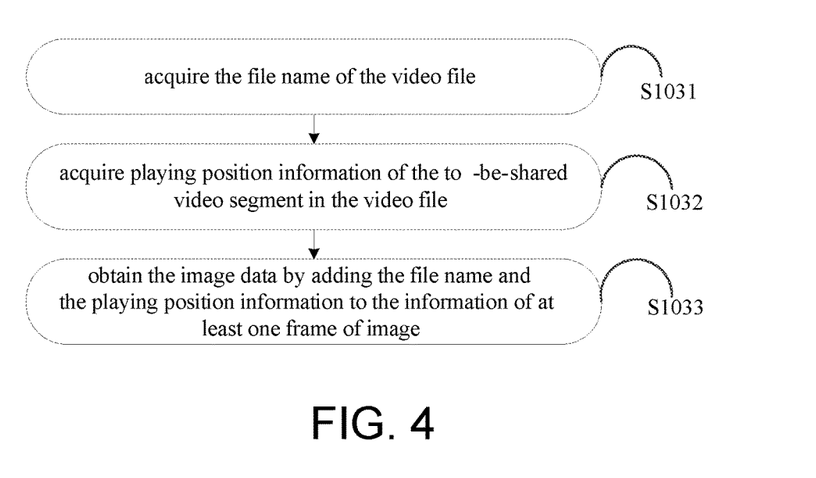
FIG. 4 is a flow diagram of one embodiment of a specific implementation of step S103.

As shown in FIG. 4, step S103 may also be implemented with the following step S1031 to step S1033.

In step S1031, the file name of the video file is acquired. In step S1032, playing position information of the to-be-shared video segment in the video file is acquired. In step S1033, the image data is obtained by adding the file name and the playing position information to the information of at least one frame of image.

The above example is continued here to describe some exemplary embodiments. After obtaining the information of three frames of image of the to-be-shared video segment based on the first image, the second image and the third image through step S102, the mobile phone may acquire the file name of the first video file. The mobile phone may acquire the file name of the first video file by inquiring into the file properties of the first video file, or by other ways which are not limited herein. After that, the mobile phone may also acquire playing position information of the to-be-shared video segment in the first video file. The playing position information may be acquired by any one of at least the following two approaches.

Figure 5:
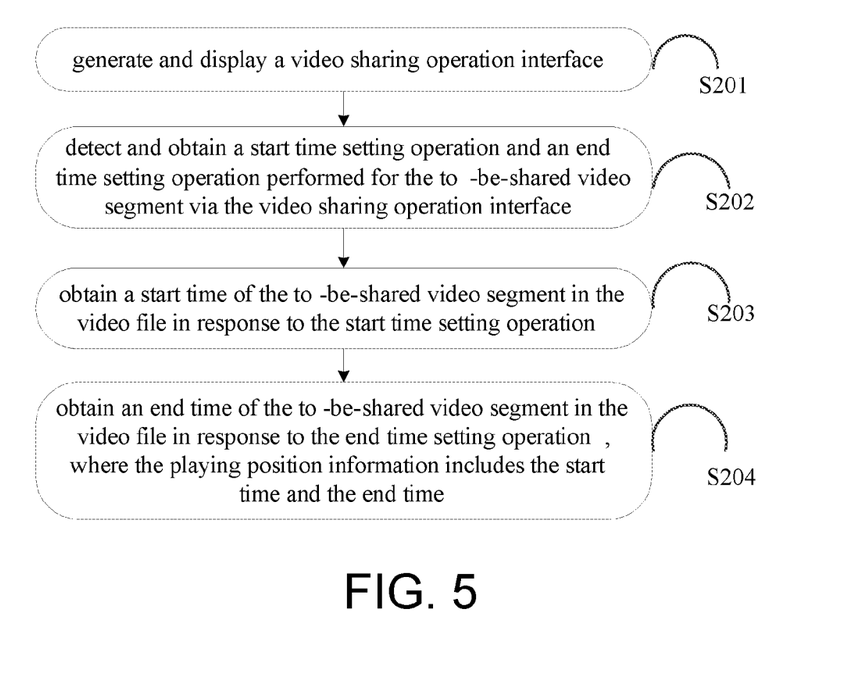
FIG. 5 is a flow diagram of one embodiment of a first implementation of step S1032.

FIG. 5 shows one implementation of the step S1032, which includes step S201 to step S204. In step S201, a video sharing operation interface is generated and displayed. In step S202, a start time setting operation and an end time setting operation performed for the to-be-shared video segment via the video sharing operation interface are detected and obtained. In step S203, a start time of the to-be-shared video segment in the video file is obtained in response to the start time setting operation. In step S204, an end time of the to-be-shared video segment in the video file is obtained in response to the end time setting operation. The playing position information includes the start time and the end time.

The above example is still used in describing a specific implementation. The mobile phone may generate the video sharing operation interface to acquire information regarding the start position and end position of the segment to be shared that is selected by a user in the first video file. The mobile phone may display the generated video sharing operation interface at any position in the window in which the video file is being played. Alternatively, the mobile phone may also reduce the size of the window in which the video file is being played, so as to have a space on the screen to display the generated video sharing operation interface. The following description uses an example wherein the size of the window in which the video file is being played is reduced, so as to display the generated video sharing operation interface in a blank place on the screen.

In this example, the mobile phone may detect and obtain, via the video sharing operation interface displayed in the blank place on the screen of the mobile phone, a start position setting operation and an end position setting operation performed by a user for the to-be-shared video segment in the first video file. For example, in a case that the video segment to be share is a segment from the $2^{nd}$ second to the $10^{th}$ second of the first video file, the mobile phone obtains, via the video sharing operation interface, the operation setting the start time of the to-be-shared video segment as the $2^{nd}$ second of the first video file. In response to the setting operation, the mobile phone obtains the start time of the to-be-shared video segment as the $2^{nd}$ second of the first video file.

Similarly, the mobile phone may obtain, via the video sharing operation interface, the operation setting the end time of the to-be-shared video segment as the $10^{th}$ second of the first video file. In response to the setting operation, the mobile phone obtains the end time of the to-be-shared video segment as the $10^{th}$ second of the first video file. In this case, the playing position information of the to-be-shared video segment includes the information of the $2^{nd}$ second and $10^{th}$ second of the first video file. After that, the mobile phone performs step S1033 to add the obtained playing position information of the to-be-shared video segment in the first video file and the file name of the first video file. In this example, the information of the $2^{nd}$ second and $10^{th}$ second of the first video file and the file name of the first video file, to the information of the three frames of image, so as to form the image information of the to-be-shared video segment in the first video file.

In practice, after the image information of the to-be-shared video segment in the first video file is obtained by adding the information of the $2^{nd}$ second and $10^{th}$ second of the first video file to the information of the three frames of image, the mobile phone performs step S104 to send the image data to a second electronic device, i.e., sending the formed image data to another electronic device intended to share the video segment in the first video file.

Therefore, excessive times traditionally needed for recording the specific segment to be shared with a local screen recording tool can be avoided. Therefore, the technical problem in the prior art can be effectively solved, so as increase efficiency of video file sharing.

In addition, since the playing position information of the to-be-shared video segment is also added to the information of one or more frames of image, the sharing target terminal can find the video file quickly after receiving the information, and play the video segment to be share in the video file automatically based on the playing position information, thereby offering convenience to the user.

Figure 6:
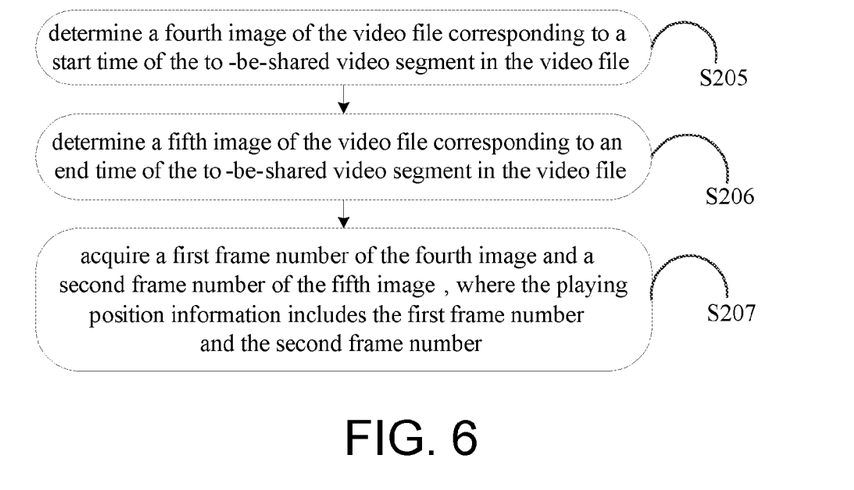
FIG. 6 is a flow diagram of one embodiment of a second implementation of step S1032.

FIG. 6 shows a second implementation of step S1032, which includes step S205 to step S207. In step S205, a fourth image of the video file corresponding to a start time of the to-be-shared video segment in the video file is determined. In step S206, a fifth image of the video file corresponding to an end time of the to-be-shared video segment in the video file is determined. In step S207, a first frame number of the fourth image and a second frame number of the fifth image are acquired. The playing position information includes the first frame number and the second frame number.

The above example will be continued here. The mobile phone may directly take a certain time point before the current playing time point as the start time of the to-be-shared video segment. Supposing that the current playing time point is the $8^{th}$ second of the first video file, and the certain time point before the current playing time point is the $2^{nd}$ second of the first video file which corresponds to a fourth image of the first video file, the mobile phone directly takes the $2^{nd}$ second of the first video file before the current playing time point of the first video file as the start time of the to-be-shared video segment, and determines that the $2^{nd}$ second of the first video file corresponds to the fourth image of the first video file.

Similarly, the mobile phone may take a certain time point after the current playing time point as the end time of the to-be-shared video segment. Supposing that the current playing time point is the $8^{th}$ second of the first video file, and the certain time point after the current playing time point is the $15^{th}$ second of the first video file which corresponds to a fifth image of the first video file, the mobile phone directly takes the $15^{th}$ second of the first video file after the current playing time point of the first video file as the end time of the to-be-shared video segment and determines that the $15^{th}$ second of the first video file corresponds to the fifth image of the first video file.

After that, the mobile phone may acquire a frame number of the fourth image of the first video file corresponding to the $2^{nd}$ second of the first video file (which is the start time of the to-be-shared video segment) and a frame number of the fifth image of the first video file corresponding to the $15^{th}$ second of the first video file (which is the end time of the to-be-shared video segment). Supposing that the frame number of the fourth image of the first video file is referred to as a first frame number and the frame number of the fifth image of the first video file is referred to as a second frame number, the playing position information of the to-be-shared video segment includes the first frame number and the second frame number. Then the mobile phone performs step S1033 to add the obtained playing position information of the to-be-shared video segment in the first video file and the name of the first video file (the first frame number, the second frame number and the name of the first video file) to the information of the three frames of image to obtain the image data of the to-be-shared video segment in the first video file.

After the image information of the to-be-shared video segment in the first video file is obtained by adding the first frame number, the second frame number and the name of the first video file to the information of the three frames of image, the mobile phone performs step S104 to send the image data to a second electronic device intended to receive the video segment in the first video file.

Therefore, excessive times traditionally needed for recording the specific segment to be shared with a local screen recording tool can be avoided. Therefore, the technical problem in the prior art can be effectively solved, so as increase efficiency of video file sharing.

In addition, since the playing position information of the to-be-shared video segment is also added to the information of one or more frames of image, the sharing target terminal can find the video file quickly after receiving the information, and play the video segment to be share in the video file automatically based on the playing position information, thereby offering convenience to the user.

Figure 7:
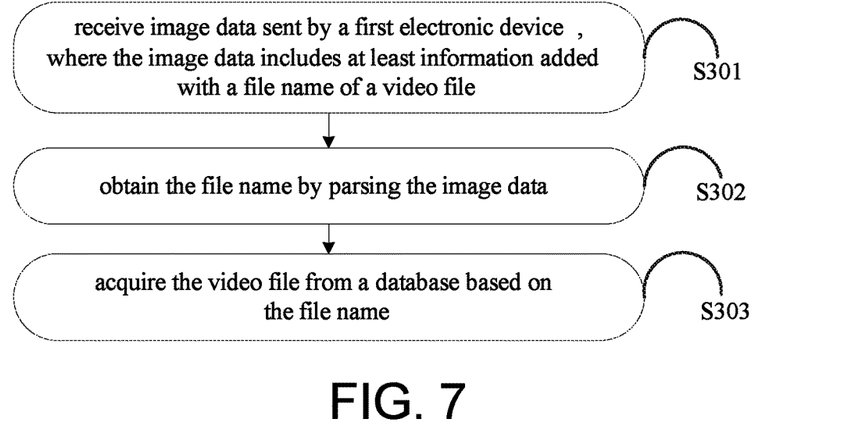
FIG. 7 is a flow diagram of one embodiment of an information processing method.

FIG. 7 depicts one embodiment of an information processing method applied to a second electronic device. FIG. 7 includes steps S301 to S303. In step S301, image data sent by a first electronic device is received. The image data at least includes information added with a file name of a video file. In step S302, the file name is obtained by parsing the image data. In step S303, the video file is acquired from a database based on the file name.

In practice, the second electronic device to which the information processing method is applied includes any electronic devices having a video player function and a signal receiving function, such as a smart phone, a computer or a tablet computer, or other capable electronic device. Other devices may be used, and the embodiments are not limited to the specific examples mentioned herein.

Step S301 is first performed to receive image data sent by a first electronic device. The image data includes at least information added with a file name of a video file.

The above example is continued here. The mobile phone has a video player function to play various video files, and a signal receiving function to receive an electrical signal sent by another electronic device to the mobile phone. For example, the mobile phone may be capable of receiving an electrical signal sent by another mobile phone, a computer or other capable device. In some embodiments, when the mobile phone is in an operating state and image data is sent by a computer, the mobile phone is capable of receiving the image data.

After step S301 is performed, step S302 is performed to obtain the file name by parsing the image data.

Figure 8:
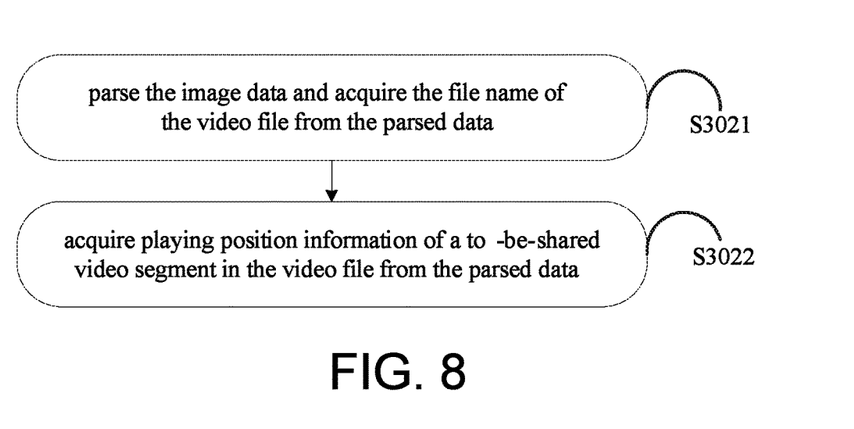
FIG. 8 is a flow diagram of one embodiment of a specific implementation of step S302.

The above example continued here. After receiving the image data sent by the computer, the mobile phone parses the image data and obtains the name of the video file added into the information of at least one frame of image in the image data. In some embodiments, step S302 may be implemented in the following approach including step S3021 and step S3022, as shown in FIG. 8.

In step S3021, the image data are parsed, and the file name of the video file is acquired from the parsed data. In step S3022, playing position information of a to-be-shared video segment in the video file is acquired from the parsed data.

After receiving the image data sent by the computer, the mobile phone parses the image data and obtains the name of the video file added to the information of image frame in the image data. The information of the image frame in the image data may include information of any number of frames of image in the to-be-shared video segment. The following description is made with an example wherein the information of the image frame in the image data includes information of one frame of image in the to-be-shared video segment. The mobile phone obtains the file name of the video file added to the information of one frame of image by parsing the received image data. Then the mobile phone may also obtain, by parsing the image data, playing position information of the to-be-shared video segment in the video file that is added to the information of one frame of image.

In practice, the playing position information of the to-be-shared video segment in the video file that is added to the information of one frame of image may include a start time and an end time of the to-be-shared video segment. For example, if the to-be-shared video segment in the video file comprises the content between the $5^{th}$ second and the $20^{th}$ second in the video file, the start time is the $5^{th}$ second of the video file and the end time is the $20^{th}$ of the video file.

Furthermore, the playing position information of the to-be-shared video segment in the video file that is added to the information of one frame of image may alternatively include the frame numbers of images corresponding to the start times and the end times of the to-be-shared video segment. For example, if the to-be-shared video segment in the video file is the content between the $10^{th}$ second and the $18^{th}$ second in the video file, the start position is the frame number of the image corresponding to the $10^{th}$ second of the video file and the end position is the frame number of the image corresponding to the $18^{th}$ second of the video file. It is apparent that the playing position information of the to-be-shared video segment in the video file that is added to the information of one frame of image may include other types of playing position information relating to the start time and the end time of the to-be-shared video segment. The embodiments are not limited to the specific examples provided herein.

After step S302 is performed, step S303 in the method is performed to acquire the video file from a database based on the file name.

Figure 9:
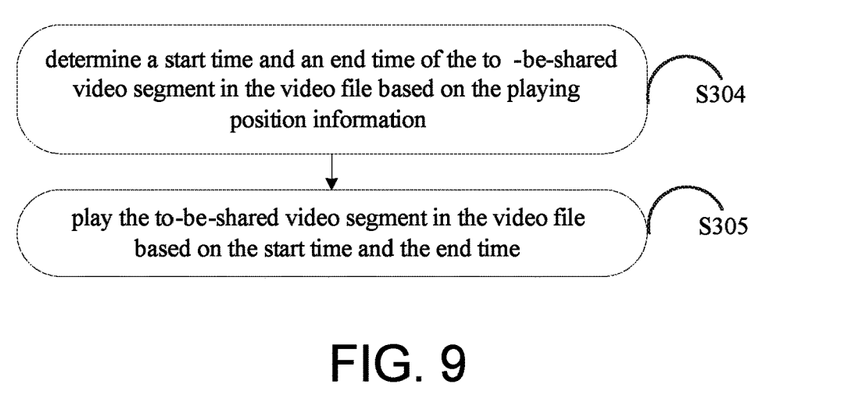
FIG. 9 is a flow diagram of one embodiment of steps that may be performed after step S303.

The above example is continued here. After obtaining the file name of the video file by parsing the received image data, the mobile phone may acquire the video file from a local database or a cloud database. In some embodiments wherein the mobile phone obtains not only the file name of the video file, but also the playing position information by parsing the received image data, the mobile phone may perform the following step S304 and step S305 as shown in FIG. 9.

In step S304, a start time and an end time of the to-be-shared video segment are determined in the video file based on the playing position information. In step S305, the to-be-shared video segment in the video file is played based on the start time and the end time.

The above example is continued here. After finding the video file having the file name from the cloud database, the mobile phone may find the start time and the end time of the to-be-shared video segment in the found video file based on the playing position information obtained by parsing. For example, if the obtained playing position information indicates that the start time of the to-be-shared video segment is the $5^{th}$ second of the video file, and the end time of the to-be-shared video segment is the $20^{th}$ second of the video file, the mobile phone may determine the start time of the to-be-shared video segment as the $5^{th}$ second of the video file, and determine the end time of the to-be-shared video segment as the $20^{th}$ second of the video file. Then the mobile phone plays the video segment in the video file from the image corresponding to the $5^{th}$ second of the video file to the image corresponding to the $20^{th}$ second of the video file.

Figure 10:
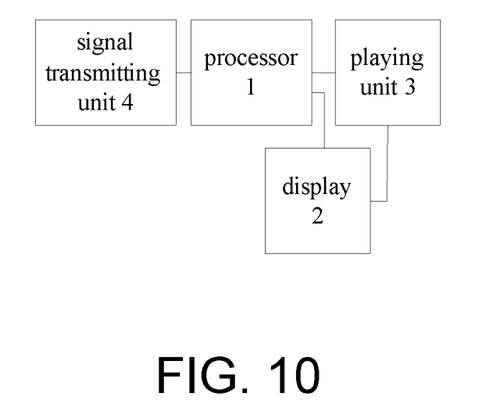
FIG. 10 is a schematic structural diagram of one embodiment of a first electronic device.

FIG. 10 depicts one embodiment of a first electronic device. The first electronic device includes: a processor 1; a display 2 connected to the processor 1; a playing unit 3 connected to the processor 1 and the display 2; and a signal transmitting unit 4 connected to the processor 1.

The processor 1 is configured to: detect and obtain a predetermined operation while the playing unit 3 is playing a video file; acquire information of at least one frame of image in the video file in response to the predetermined operation; obtain image data by adding a file name of the video file to the information of at least one frame of image; and control the signal transmitting unit 4 to send the image data to a second electronic device.

Optionally, the processor 1 is additionally configured to: acquire a first image of the video file that is played at a current playing time point; determine at least one frame of a second image of the video file between a first time point before the current playing time point and the current playing time point, and determine at least one frame of a third image of the video file between the current playing time point and a second time point after the current playing time point, where a time interval from the first time point to the current playing time point is a first predetermined time interval, and a time interval from the current playing time point to the second time point is a second predetermined time interval; and obtain the information of at least one frame of image based on the first image, the second image and the third image.

Optionally, the processor 1 is also configured to: generate an image frame selecting operation interface and control the display 2 to display the image frame selecting operation interface; detect and obtain an image frame selecting operation performed on the video file via the image frame selecting operation interface; obtain at least one frame of image in response to the image frame selecting operation; and obtain the information of at least one frame of image based on the at least one frame of image.

Optionally, the processor 1 is further configured to: acquire the file name of the video file; acquire playing position information of a to-be-shared video segment in the video file; and obtain the image data by adding the file name and the playing position information to the information of at least one frame of image.

Optionally, the processor 1 is further configured to: generate a video sharing operation interface and control the display 2 to display the video sharing operation interface; detect and obtain a start time setting operation and an end time setting operation performed for the to-be-shared video segment via the video sharing operation interface; and obtain a start time of the to-be-shared video segment in the video file in response to the start time setting operation; and obtain an end time of the to-be-shared video segment in the video file in response to the end time setting operation; wherein the playing position information includes the start time and the end time.

Optionally, the processor 1 is further configured to: determine a fourth image of the video file corresponding to a start time of the to-be-shared video segment in the video file; determine a fifth image of the video file corresponding to an end time of the to-be-shared video segment in the video file; and acquire a first frame number of the fourth image and a second frame number of the fifth image; wherein the playing position information includes the first frame number and the second frame number.

Figure 11:
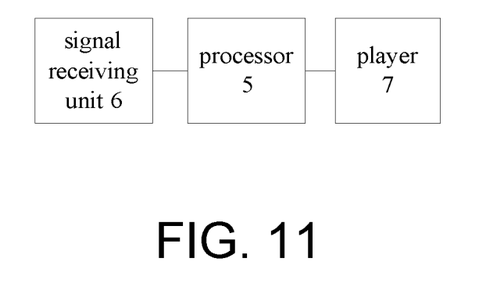
FIG. 11 is a schematic structural diagram of one embodiment of a second electronic device.

As shown in FIG. 11, a second electronic device is provided. The second electronic device includes: a processor 5; and a signal receiving unit 6 connected to the processor 5.

The processor 5 is configured to: control the signal receiving unit 6 to receive image data sent by a first electronic device, where the image data at least includes information added with a file name of a video file; obtain the file name by parsing the image data; and acquire the video file from a database based on the file name.

Optionally, the processor 5 is configured to: parse the image data and acquire the file name of the video file from the parsed data; and acquire playing position information of a to-be-shared video segment in the video file from the parsed data.

Optionally, the second electronic device further includes a player 7, and the processor 5 is further configured to: determine a start time and an end time of the to-be-shared video segment in the video file based on the playing position information; and control the player 7 to play the to-be-shared video segment in the video file based on the start time and the end time.

One or more of the above technical solutions as provided in the embodiments of the present disclosure have at least the following technical effects or advantages.

Through the embodiments, excessive times traditionally needed for recording the specific segment to be shared with a local screen recording tool can be avoided. Therefore, the technical problem in the prior art can be effectively solved, so as increase efficiency of video file sharing.

In addition, since the playing position information of the to-be-shared video segment is also added to the information of one or more frames of image, the sharing target terminal can find the video file quickly after receiving the information, and play the video segment to be share in the video file automatically based on the playing position information, thereby offering convenience to the user.

Those skilled in the art should understand that the embodiments may be embodied as a method, a system or a computer program product. Therefore, the technical solution may be implemented in the form of a hardware-only embodiment, a software-only embodiment, or an embodiment of a combination of hardware and software. Moreover, the embodiments be in the form of a computer program product which is implemented on one or more computer usable storage media (including, but not limited to, disk storage, CD-ROM, optical storage, and the like) which contains computer usable program codes thereon.

The embodiments are described with reference to the methods, devices (systems) and flow diagrams and/or block diagrams of computer program products. It should be understood that computer program instructions may be used to implement each process and/or block in the flow diagrams and/or block diagrams, and combinations of processes and/or blocks in the flow diagrams and/or block diagrams. These computer program instructions may be provided to a general-purpose computer, a dedicated computer, an embedded processor or other programmable data processing devices to generate a machine, such that the instructions, which are executed via the processor of the computer or other programmable data processing devices, create means for implementing the functions specified in one or more flows of the flow diagram and/or one or more blocks of the block diagram.

These computer program instructions may also be stored in a computer readable memory that can direct a computer or other programmable data processing devices to function in a particular manner, such that the instructions stored in the computer readable memory produce an article of manufacture including instruction means implementing the function specified in one or more flows of the flow diagram and/or one or more blocks of the block diagram.

These computer program instructions may also be loaded onto a computer or other programmable data processing devices to cause a series of operational steps to be performed on the computer or other programmable devices to produce a computer implemented process such that the instructions that are executed on the computer or other programmable devices provide steps for implementing the functions specified in one or more flows of the flow diagram and/or one or more blocks of the block diagram.

Specifically, the computer program instructions corresponding to the information processing method in the embodiment of the present disclosure can be stored in a storage medium such as an optical disc, a hard disk, and a USB flash disk. When the computer program instructions corresponding to the information processing method in the storage medium are read or executed by an electronic device, the following steps are included:

Detecting and obtaining a predetermined operation while playing a video file; acquiring information of at least one frame of image in the video file in response to the predetermined operation; obtaining image data by adding a file name of the video file to the information of at least one frame of image; and sending the image data to a second electronic device.

Optionally, when the computer program instructions corresponding to the step of acquiring information of at least one frame of image in the video file stored in the storage medium are executed, the following steps are included:

acquiring a first image that is played at a current playing time point of the video file; determining at least one frame of a second image of the video file between a first time point before the current playing time point and the current playing time point, and determining at least one frame of a third image of the video file between the current playing time point and a second time point after the current playing time point, where a time interval from the first time point to the current playing time point is a first predetermined time interval, and a time interval from the current playing time point to the second time point is a second predetermined time interval; and obtaining the information of at least one frame of image based on the first image, the second image and the third image.

Optionally, when the computer program instructions corresponding to the step of acquiring information of at least one frame of image in the video file stored in the storage medium are executed, the following steps are included:

Generating and displaying an image frame selecting operation interface; detecting and obtaining an image frame selecting operation performed on the video file via the image frame selecting operation interface; obtaining at least one frame of image in response to the image frame selecting operation; and obtaining the information of at least one frame of image based on the at least one frame of image.

Optionally, when the computer program instructions corresponding to the step of obtaining image data by adding a file name of the video file to the information of at least one frame of image stored in the storage medium are executed, the following steps are included:

Acquiring the file name of the video file; acquiring playing position information of a to-be-shared video segment in the video file; and obtaining the image data by adding the file name and the playing position information to the information of at least one frame of image.

Optionally, when the computer program instructions corresponding to the step of acquiring playing position information of a to-be-shared video segment in the video file stored in the storage medium are executed, the following steps are included:

Generating and displaying a video sharing operation interface; detecting and obtaining a start time setting operation and an end time setting operation performed for the to-be-shared video segment via the video sharing operation interface; obtaining a start time of the to-be-shared video segment in the video file in response to the start time setting operation; and obtaining an end time of the to-be-shared video segment in the video file in response to the end time setting operation; wherein the playing position information includes the start time and the end time.

Optionally, when the computer program instructions corresponding to the step of acquiring playing position information of a to-be-shared video segment in the video file stored in the storage medium are executed, the following steps are included:

Determining a fourth image of the video file corresponding to a start time of the to-be-shared video segment in the video file; determining a fifth image of the video file corresponding to an end time of the to-be-shared video segment in the video file; and acquiring a first frame number of the fourth image and a second frame number of the fifth image; wherein the playing position information includes the first frame number and the second frame number.

While preferred embodiments have been described, variations and modifications may be made to these embodiments once the basic inventive concept is obtained by those skilled in the art. Thus, the attached claims are intended to be explained as including the preferred embodiments and all variations and modifications that fall within the scope of the present disclosure.

It is clear that various variations and modifications may be made by those skilled in the art without departing from the spirit and scope of the present disclosure.

Accordingly, if these variations and modifications fall within the scope of the claims and the equivalents thereof, it is also intended that this disclosure encompass these variations and modifications.

What is claimed is:

1. A method, comprising:
   detecting a predetermined operation performed on a first electronic device that is playing a video file;
   determining at least one frame of the video file corresponding to the predetermined operation;
   obtaining image data, comprising
      acquiring the file name of the video file,
      acquiring playback position information of a to-be-shared video segment of the video file, and
      adding the file name and the playback position information to information of at least one frame; and
   sending the at least one frame of the video file as determined to a second electronic device.

2. The method of claim 1, wherein determining at least one frame of the video file corresponding to the predetermined operation comprises:
   acquiring a first image located at a playback position of the video file;
   determining at least one frame of a second image of the video file;
   determining at least one frame of a third image of the video file; and
   obtaining information of at least one frame based on the first image, the second image and the third image;
   wherein
      the at least one frame of the second image of the video file is located between the playback position and a first time point located before the playback position,
      the at least one frame of the third image of the video file is located between the playback position and a second time point located after the playback position,
      a time interval from the first time point to the playback position is a first predetermined time interval, and
      a time interval from the playback position to the second time point is a second predetermined time interval.

3. The method of claim 2, wherein acquiring playback position information of a to-be-shared video segment of the video file comprises:
   generating and displaying a video sharing operation interface;
   detecting and obtaining a start time setting operation and an end time setting operation performed via the video sharing operation interface;
   obtaining a start time of the to-be-shared video segment of the video file in response to the start time setting operation; and
   obtaining an end time of the to-be-shared video segment of the video file in response to the end time setting operation;
   wherein the playback position information comprises the start time and the end time.

4. The method of claim 2, wherein acquiring playback position information of a to-be-shared video segment of the video file comprises:
   determining a fourth image of the video file corresponding to a start time of the to-be-shared video segment of the video file;
   determining a fifth image of the video file corresponding to an end time of the to-be-shared video segment of the video file; and
   acquiring a first frame number corresponding to the fourth image and a second frame number corresponding to the fifth image;
   wherein the playback position information comprises the first frame number and the second frame number.

5. The method of claim 1, wherein determining at least one frame of the video file corresponding to the predetermined operation comprises:
   generating and displaying a frame selection interface;
   detecting and obtaining a frame selection operation performed via the frame selection interface;
   obtaining at least one frame in response to the frame selection operation; and
   obtaining information of the at least one frame based on the at least one frame.

6. The method of claim 5, further comprising
   obtaining image data, comprising
      acquiring the file name of the video file;
      acquiring playback position information of a to-be-shared video segment of the video file; and
      adding the file name and the playback position information to the information of at least one frame.

7. The method of claim 6, wherein the acquiring playback position information of a to-be-shared video segment of the video file comprises:
   generating and displaying a video sharing operation interface;
   detecting and obtaining a start time setting operation and an end time setting operation performed via the video sharing operation interface;
   obtaining a start time of the to-be-shared video segment of the video file in response to the start time setting operation; and
   obtaining an end time of the to-be-shared video segment of the video file in response to the end time setting operation;
   wherein the playback position information comprises the start time and the end time.

8. The method of claim 6, wherein acquiring playback position information of a to-be-shared video segment of the video file comprises:
   determining a first image of the video file corresponding to a start time of the to-be-shared video segment of the video file;
   determining a second image of the video file corresponding to an end time of the to-be-shared video segment of the video file; and
   acquiring a first frame number corresponding to the first image and a second frame number corresponding to the second image;
   wherein the playback position information comprises the first frame number and the second frame number.

9. A first electronic device, comprising
   a processor,
   a display operatively coupled to the processor,
   a playing unit operatively coupled to the processor and the display, and
   a signal transmitting unit operatively coupled to the processor;
   wherein the processor:
      detects a predetermined operation while the playing unit is playing a video file,
      determines at least one frame of the video file corresponding to the predetermined operation,
      obtains image data by
         acquiring a file name of the video file,
         acquiring playback position information of a to-be-shared video segment of the video file, and
         adding the file name and the playback position information to information of at least one frame, and
      controls the signal transmitting unit to send the at least one frame of the video file as determined to a second electronic device.

10. The first electronic device of claim 9, wherein the processor:
   acquires a first image located at a playback position of the video file;
   determines at least one frame of a second image of the video file;
   determines at least one frame of a third image of the video file; and
   obtains the information of at least one frame based on the first image, the second image and the third image;
   wherein
      the at least one frame of the second image of the video file is located between the playback position and a first time point located before the playback position,
      the at least one frame of the third image of the video file is located between the playback position and a second time point located after the playback position,
      a time interval from the first time point to the playback position is a first predetermined time interval, and
      a time interval from the playback position to the second time point is a second predetermined time interval.

11. The first electronic device of claim 10, wherein the processor:
   generates a video sharing operation interface and controls the display to display the video sharing operation interface;
   detects and obtains a start time setting operation and an end time setting operation performed via the video sharing operation interface;
   obtains a start time of the to-be-shared video segment of the video file in response to the start time setting operation; and
   obtains an end time of the to-be-shared video segment of the video file in response to the end time setting operation;
   wherein the playback position information comprises the start time and the end time.

12. The first electronic device of claim 10, wherein the processor:
   determines a fourth image of the video file corresponding to a start time of the to-be-shared video segment of the video file;
   determines a fifth image of the video file corresponding to an end time of the to-be-shared video segment of the video file; and
   acquires a first frame number corresponding to the fourth image and a second frame number corresponding to the fifth image,
   wherein the playback position information comprises the first frame number and the second frame number.

13. The first electronic device of claim 9, wherein the processor:
   generates a frame selection interface and controls the display to display the frame selection interface;
   detects and obtains a frame selection operation performed via the frame selection interface;
   obtains at least one frame in response to the frame selection operation; and
   obtains the information of at least one frame based on the at least one frame.

14. The first electronic device of claim 13, wherein the processor obtains image data by
   acquiring a file name of the video file,
   acquiring playback position information of a to-be-shared video segment of the video file, and
   adding the file name and the playback position information to the information of at least one frame.

15. The first electronic device of claim 14, wherein the processor:
   generates a video sharing operation interface and control the display to display the video sharing operation interface;
   detects and obtains a start time setting operation and an end time setting operation performed via the video sharing operation interface;
   obtains a start time of the to-be-shared video segment of the video file in response to the start time setting operation; and obtains an end time of the to-be-shared video segment of the video file in response to the end time setting operation;

wherein the playback position information comprises the start time and the end time.

16. The first electronic device of claim 14, wherein the processor determines a first image of the video file corresponding to a start time of the to-be-shared video segment of the video file;

determines a second image of the video file corresponding to an end time of the to-be-shared video segment of the video file; and acquires a first frame number corresponding to the first image and a second frame number corresponding to the second image;

wherein the playback position information comprises the first frame number and the second frame number.

* * * * *